(12) United States Patent
Torii et al.

(10) Patent No.: US 12,047,667 B2
(45) Date of Patent: Jul. 23, 2024

(54) IMAGING DEVICE

(71) Applicant: KOITO MANUFACTURING CO., LTD., Tokyo (JP)

(72) Inventors: Teruaki Torii, Shizuoka (JP); Yuta Haruse, Shizuoka (JP); Shintaro Sugimoto, Shizuoka (JP); Kento Nitta, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 386 days.

(21) Appl. No.: 17/570,501

(22) Filed: Jan. 7, 2022

(65) Prior Publication Data
US 2022/0132022 A1 Apr. 28, 2022

Related U.S. Application Data

(63) Continuation of application No. PCT/JP2020/027092, filed on Jul. 10, 2020.

(30) Foreign Application Priority Data

Jul. 12, 2019 (JP) .................. 2019-130478
Jul. 16, 2019 (JP) .................. 2019-131347

(51) Int. Cl.
*H04N 23/61* (2023.01)
*G06V 10/22* (2022.01)
(Continued)

(52) U.S. Cl.
CPC ............. *H04N 23/61* (2023.01); *G06V 10/23* (2022.01); *G06V 30/14* (2022.01); *H04N 23/51* (2023.01); *H04N 23/56* (2023.01); *H04N 23/80* (2023.01)

(58) Field of Classification Search
CPC ........ H04N 23/61; H04N 23/51; H04N 23/56; H04N 23/80; H04N 23/11; H04N 23/57;
(Continued)

(56) References Cited

U.S. PATENT DOCUMENTS 11,250,266 B2 * 2/2022 Ton-That ............... G06V 40/45
2019/0191993 A1 * 6/2019 Gill ......................... A61B 3/145
2020/0032976 A1 * 1/2020 Shimada ............... B60Q 1/0023

FOREIGN PATENT DOCUMENTS

CN 104570000 A 4/2015
CN 108363069 A 8/2018
(Continued)

OTHER PUBLICATIONS

International Search Report (PCT/ISA/210) with translation, and Written Opinion (PCT/ISA/237) mailed on Sep. 29, 2020, by the Japan Patent Office as the International Searching Authority for International Application No. PCT/JP2020/027092.
(Continued)

*Primary Examiner* — John B Strege
(74) *Attorney, Agent, or Firm* — Buchanan Ingersoll & Rooney PC

(57) ABSTRACT

Patterning device modulates a light beam intensity distribution according to two-gradation first image data having a first number of pixels. Processing device calculates a correlation between detection intensity b based on output of photodetector and m-gradation (m≥2) random second image data having a second number of pixels smaller than the first number, to generate a reconstructed image $G(x,y)$ of an object. When the first and second image data are scaled to the same size and overlapped, each pixel is associated with a pixel group including multiple pixels of the overlapping first image data. With the normalized gradation value of a given pixel as k, the number of pixels included in the pixel
(Continued)

group as L, and the number of pixels having a value of 1 in the pixel group as l, l=L×k holds true.

10 Claims, 13 Drawing Sheets

(51) Int. Cl.
*G06V 30/14* (2022.01)
*H04N 23/51* (2023.01)
*H04N 23/56* (2023.01)
*H04N 23/80* (2023.01)

(58) Field of Classification Search
CPC ...... H04N 23/667; H04N 23/75; H04N 23/54; H04N 23/951; G06V 10/23; G06V 10/145; G06V 30/14; G06V 20/58; B60Q 1/0023; G01S 17/46; G01S 17/931; G01S 17/89
See application file for complete search history.

(56) References Cited

FOREIGN PATENT DOCUMENTS

| | | | |
|---|---|---|---|
| JP | 2017525952 | A | 9/2017 |
| JP | 6412673 | B1 | 10/2018 |
| WO | 2017187484 | A1 | 11/2017 |

OTHER PUBLICATIONS

Hirota, O., et al., "Quantum & Classical Radar Camera, and Effect of Fog for Self Driving Car", The proceedings of the Symposium on Information Theory and Its Applications (SITA 2017), Nov. 28-Dec. 1, 2017, pp. 353-358.

Mei, X., et al., "Experimental demonstration of Vehicle-borne Near Infrared Three-Dimensional Ghost Imaging LiDAR", 2019 Conference on Lasers and Electro-Optics (CLEO), Jul. 1, 2019, internet: https://ieeexplore.ieee.org/document/8749837 (2 pages).

\* cited by examiner

FIG. 10A
IMG2
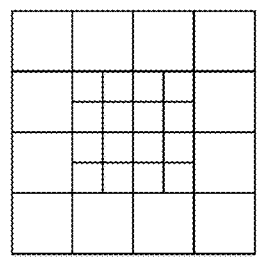
FIG. 10B
IMG2
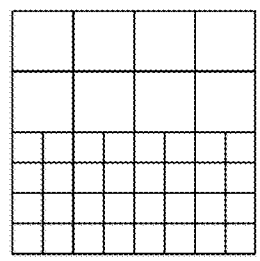
FIG. 10C
IMG3
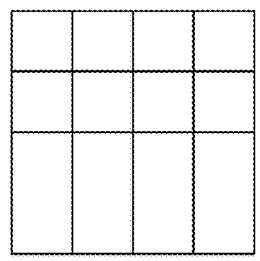
FIG. 11
IMG1 (two-gradation)
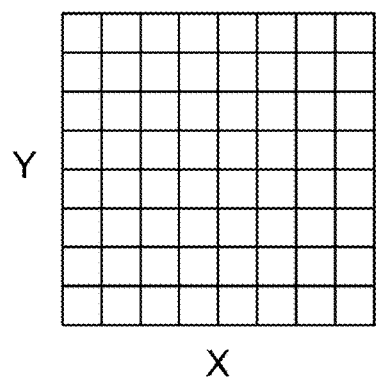
IMG2 ($m_1$-gradation)
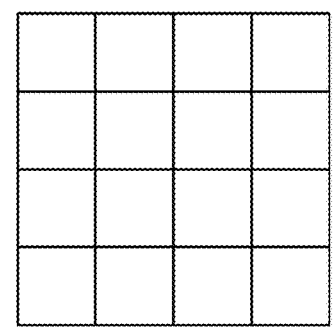
IMG2 ($m_2$-gradation)
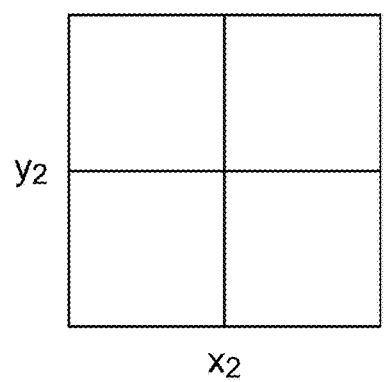

| | FUNCTION | ILLUMINATION APPARATUS | DETECTION WAVELENGTH | PROCESSING |
|---|---|---|---|---|
| FIRST MODE | QUANTUM RADAR | RANDOM IRRADIATION | IR | CORRELATION CALCULATION |
| SECOND MODE | NIGHT-VISION CAMERA | UNIFORM IRRADIATION | IR | IMAGE PROCESSING |
| THIRD MODE | VISIBLE-LIGHT CAMERA | OFF | VISIBLE LIGHT | IMAGE PROCESSING |

IMAGING DEVICE

BACKGROUND

1. Technical Field

The present disclosure relates to an imaging apparatus.

2. Description of the Related Art

In order to support autonomous driving or autonomous control of the light distribution of a headlamp, an object identification system is employed for sensing the position and the kind of an object that exists in the vicinity of a vehicle. The object identification system includes a sensor and a processing device configured to analyze the output of the sensor. As such a sensor, a desired one is selected from among a camera, LiDAR (Light Detection and Ranging, Laser Imaging Detection and Ranging), millimeter-wave radar, ultrasonic sonar, etc., giving consideration to the usage, required precision, and cost.

As one from among imaging apparatuses (sensors), an imaging apparatus (which will be referred to as a "quantum radar") using the principle of ghost imaging is known. In ghost imaging, reference light is irradiated to an object while randomly switching the intensity distribution (pattern) of the reference light, and the light intensity of the reflected light is detected and received for each pattern. The light intensity is detected as the energy over a given plane or the integrated value of the intensity. That is to say, the light intensity is not detected as an intensity distribution. With this, by calculating the correlation between each pattern and the detected light intensity, a reconstructed image of the object is obtained.

A quantum radar is capable of acquiring an image of an object in a poor-visibility environment such as a foggy environment or the like in which an ordinary two-dimensional image sensor (camera) is not able to capture an image of such an object. However, the quantum radar needs to irradiate reference light multiple times in order to reconstruct a single image. This leads to a low frame rate as compared with ordinary cameras. Accordingly, in some cases, in a good-visibility environment, a two-dimensional image sensor is preferably employed as compared with such a quantum radar.

SUMMARY

1. An embodiment of the present disclosure has been made in view of such a situation. Accordingly, it is an exemplary purpose of an embodiment thereof to provide an imaging apparatus and an illumination apparatus thereof that provides both high image quality and a high frame rate.

2. Also, it is an exemplary purpose of an embodiment of the present disclosure to provide an imaging apparatus having both an advantage of a quantum radar and an advantage of a two-dimensional image sensor.

1. An embodiment of the present disclosure relates to an imaging apparatus using correlation calculation. The imaging apparatus includes: a light source structured to generate a light beam having a uniform intensity distribution; a patterning device structured to modulate the intensity distribution of the light beam according to two-gradation (two-level) first image data; a photodetector structured to receive reflected light from an object; and a processing device structured to perform calculation of a correlation between a detection intensity based on an output of the photodetector and m-gradation (m≥2) second image data, so as to reconstruct a reconstructed image of the object. The number of pixels of the first image data is larger than the number of pixels of the second image data. Each pixel of the second image data is associated with a pixel group including a plurality of L pixels of the first image data. With a normalized gradation value of a given pixel of the second image data as k, and with the number of pixels having a value of 1 included in the pixel group that corresponds to the given pixel as l, a relation l=L×k holds true.

Another embodiment of the present disclosure relates to an illumination apparatus employed in an imaging apparatus using correlation calculation. The illumination apparatus includes: a light source structured to generate a light beam having a uniform intensity distribution; a patterning device including an array of pixels having a first number of pixels, and structured to modulate the intensity distribution of the light beam according to two-gradation first image data including the first number of pixels; and a controller structured to generate m-gradation (m≥2) random second image data including a second number of pixels that is smaller than the first number of pixels so as to supply the second image data to correlation calculation, to convert the second image data into the first image data, and to supply the first image data to the patterning device.

2. Yet another embodiment of the present disclosure relates to an imaging apparatus. The imaging apparatus includes: an illumination apparatus structured to irradiate infrared reference light having a controllable intensity distribution to an object; a two-dimensional image sensor structured to be sensitive to an infrared range; and a processing device structured to process an image captured by the two-dimensional image sensor. (i) In a first mode, the illumination apparatus changes the intensity distribution of the reference light based on a sequence of multiple items of patterning data. In parallel, the two-dimensional image sensor captures multiple images. The processing device calculates a light detection intensity that corresponds to an integrated value of multiple pixels for each of the multiple images. Furthermore, the processing device calculates a correlation between multiple light detection intensities that correspond to the multiple images and the multiple items of patterning data, so as to output a first output image. (ii) In a second mode, the processing device outputs a second output image based on an image captured by the two-dimensional image sensor.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 10A through 10C are diagrams each showing the second image data according to a modification 1.1;

FIG. 11 is a diagram showing the first image data and the second image data according to a modification 1.2;

DETAILED DESCRIPTION

Outline of Embodiments

Figure 1:
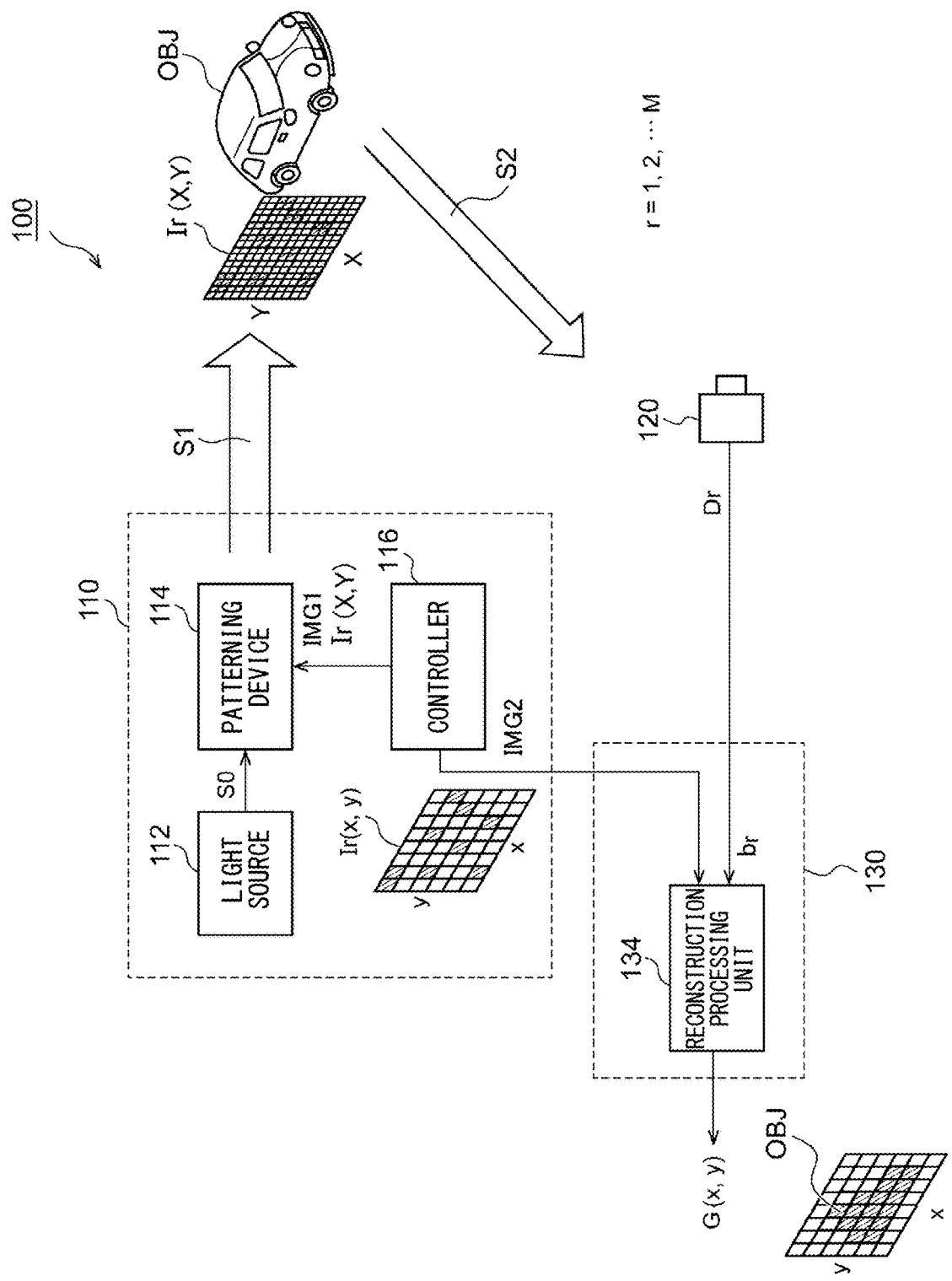
FIG. 1 is a diagram showing an imaging apparatus according to an embodiment 1.

Description will be made regarding an outline of several example embodiments of the present disclosure. In this outline, some concepts of one or more embodiments will be described in a simplified form as a prelude to the more detailed description that is presented later in order to provide a basic understanding of such embodiments. Accordingly, the outline is by no means intended to restrict the scope of the present invention or the present disclosure. Furthermore, this outline is not an extensive overview of all conceivable embodiments, and is by no means intended to restrict essential elements of the embodiments. For convenience, the term "one embodiment" may be used herein to refer to a single embodiment (example of modification) or multiple embodiments (examples of modifications) disclosed in the present specification.

1. An embodiment relates to an imaging apparatus using correlation calculation. The imaging apparatus includes: a light source structured to generate a light beam having a uniform intensity distribution; a patterning device structured to modulate the intensity distribution of the light beam according to two-gradation first image data; a photodetector structured to receive reflected light from an object; and a processing device structured to perform calculation of a correlation between a detection intensity based on an output of the photodetector and m-gradation (m≥2) second image data, so as to reconstruct a reconstructed image of the object. The number of pixels of the first image data is larger than the number of pixels of the second image data. Each pixel of the second image data is associated with a pixel group including a plurality of L pixels of the first image data. With a normalized gradation value of a given pixel of the second image data as k, and with the number of pixels having a value of 1 included in the pixel group that corresponds to the given pixel as l, a relation l=L×k holds true.

Typically, in a case in which the patterning device is operated in a multi-gradation manner, such an arrangement involves a reduced frame rate. With this embodiment, the patterning device having a larger number of pixels than that of the second image data to be used in the correlation calculation is employed, and is operated a single-bit manner. This provides a high frame rate. The intensity distribution of the reference light generated by the patterning device is represented in a multi-gradation manner when it is viewed with the number of pixels (resolution) of the second image data, thereby providing high image quality.

Also, the imaging apparatus may further include a controller structured to generate the second image data. Also, the controller may convert the second image data so as to generate the first image data.

Also, the controller may assign values from among 1 and 0 to the pixel group according to a predetermined layout rule.

Also, the layout rule may be determined such that a value of 1 is preferentially assigned to pixels from the center of the pixel group. This allows interference to be reduced between adjacent pixel groups of the patterning device.

Also, the layout rule may be determined such that a value of 1 is uniformly assigned to the pixel group.

Also, the layout rule may be determined such that the values of 1 and 0 are randomly assigned to the pixel group.

Also, there may be a size difference in pixels that form the second image data corresponding to the position thereof. This is capable of locally controlling the resolution.

Also, the patterning device may be configured as a Digital Micromirror Device (DMD).

The illumination apparatus may be employed in the imaging apparatus using the correlation calculation. In addition to the illumination apparatus, the imaging apparatus includes a photodetector structured to receive reflected light from an object, and a processing device structured to calculate a correlation between the detection intensity based on the output of the photodetector and the second image data so as to generate a reconstructed image of the object.

2. An imaging apparatus according to an embodiment includes: an illumination apparatus structured to irradiate infrared reference light having a controllable intensity distribution to an object; a two-dimensional image sensor structured to be sensitive to an infrared range; and a processing device structured to process an image captured by the two-dimensional image sensor. The imaging apparatus is configured to be switchable between the first mode and the second mode.

(i) First Mode

The illumination apparatus changes the intensity distribution of the reference light based on a sequence of multiple items of patterning data. In this period, the two-dimensional image sensor captures multiple images. The processing device calculates a light detection intensity that corresponds to an integrated value of multiple pixels for each of the multiple images. Furthermore, the processing device calculates a correlation between multiple light detection intensities that correspond to the multiple images and the multiple items of patterning data, so as to output a first output image.

(ii) Second Mode

The processing device outputs a second output image based on an image captured by the two-dimensional image sensor.

In the first mode, the imaging apparatus operates as a quantum radar. In the second mode, the imaging apparatus operates as a camera (two-dimensional sensor). This provides both the advantage of a quantum radar and the advantage of a two-dimensional sensor.

Furthermore, the two-dimensional image sensor and the optical system can be shared between the first mode and the second mode, thereby allowing an image with the same angle of view to be obtained regardless of the mode from among the first mode and the second mode. In addition, this arrangement has an advantage of no parallax between the two modes.

Also, in the second mode, the illumination apparatus may irradiate the reference light having a uniform intensity distribution. The two-dimensional image sensor may operate as an active sensor that detects reflected light of the reference light from an object. The imaging apparatus may be used as a night-vision camera.

Also, the processing unit may be configured to be capable of judging whether a visibility level is good or poor. When judgement has been made that the visibility is poor, the first mode may be selected. When the judgment has been made that the visibility is good, the second mode may be selected.

Also, in a third mode, the imaging apparatus may operate as a passive sensor. Also, in the third mode, the illumination apparatus may stop emitting light. Also, the processing device may output a third output image based on an image captured by the two-dimensional image sensor.

Also, the two-dimensional image sensor may be sensitive to a visible light range in addition to the infrared range. Also, the third output image may be a visible-light image.

Also, the processing unit is configured to be capable of judging whether visibility is good or poor and brightness of the surroundings. (i) When judgement has been made that the visibility is poor, the first mode may be selected. (ii) When the judgment has been made that the visibility is good and the surroundings are dark, the second mode may be selected. (iii) When the judgment has been made that the visibility is good and the surroundings are bright, the third mode may be selected.

Also, the third output image may be an infrared image.

The imaging apparatus may support a hybrid mode.

In the hybrid mode, the illumination apparatus changes the intensity distribution of a first portion of the reference light, and generates a second portion of the reference light with a uniform intensity distribution. The processing device generates the first output image by calculating a correlation with respect to the irradiation region of the first portion of the reference light, and generates the second output image based on an image captured by the two-dimensional image sensor with respect to the irradiation region of the second portion of the reference light.

This allows the imaging apparatus to operate as a quantum radar for only a poor-visibility region in a situation in which there is a local poor-visibility region.

Also, in the second mode, the imaging apparatus may operate as a passive sensor. Also, in the second mode, the illumination apparatus may stop emitting light.

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

The "random intensity distribution" in the present specification does not mean that the intensity distribution is completely random. Rather, the intensity distribution may be random to an extent that allows an image to be reconstructed by ghost imaging. Accordingly, "random" in the present specification may include a certain degree of regularity.

Also, "random" does not require the intensity distribution to be completely unpredictable. That is to say, the intensity distribution may also be predictable and reproducible.

Embodiment 1

FIG. 1 is a diagram showing an imaging apparatus 100 according to an embodiment 1. The imaging apparatus 100 is configured as a correlation function image sensor using the principle of ghost imaging. The imaging apparatus 100 includes an illumination apparatus 110, a photodetector 120, and a processing device 130. The imaging apparatus 100 will also be referred to as a "quantum radar camera".

The illumination apparatus 110 is configured as a pseudo-thermal light source. The illumination apparatus 110 generates reference light S1 having an intensity distribution I(x,y) that can be regarded as substantially random. The illumination apparatus 110 irradiates the reference light to an object OBJ. The reference light S1 is irradiated to the object OBJ with the intensity distribution I(x,y) that is changed according to a plurality of M patterns.

The illumination apparatus 110 includes a light source 112, a patterning device 114, and a controller 116. The light source 112 generates a light beam S0 having a uniform intensity distribution. As the light source 112, a laser, light-emitting diode, or the like may be employed. Preferably, the light beam S0 is configured as infrared light. However, the wavelength and the spectrum of the light beam S0 are not restricted in particular. As the light beam S0, white light having multiple wavelengths or a continuous spectrum may be employed. Also, monochromatic light having a predetermined wavelength may be employed.

The patterning device 114 includes a first number of pixels (X×Y) in an array. The patterning device 114 receives two-gradation first image data IMG1 having the first number of pixels (X×Y), and controls the pixel array according to the first image data IMG1 so as to modulate the intensity distribution of the light beam S0. As the patterning device 114, a Digital Micromirror Device (DMD) or a liquid crystal device may be employed. In the present embodiment, the patterning device 114 is configured as a DMD.

Figure 2A:
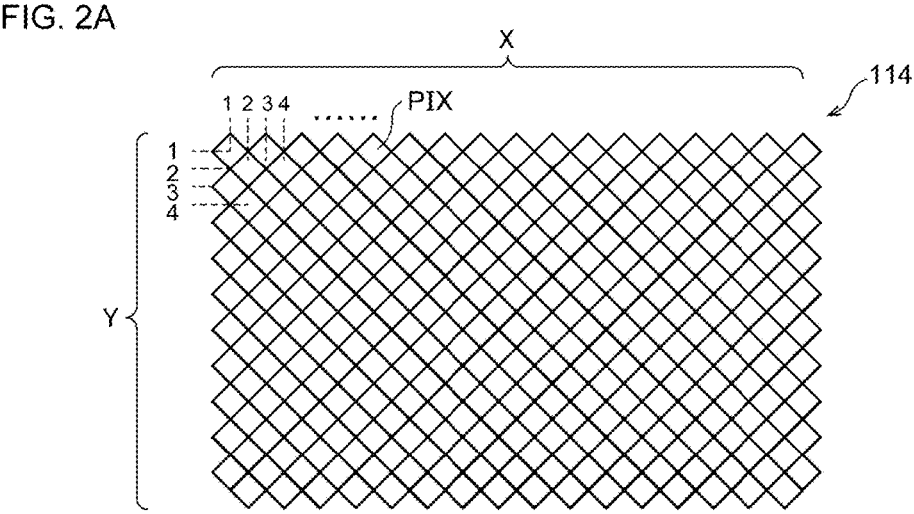
FIGS. 2A through 2C are diagrams for explaining the pixels of a DMD configured as a patterning device.
Figure 2B:
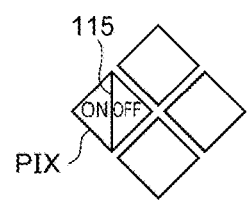
Figure 2C:
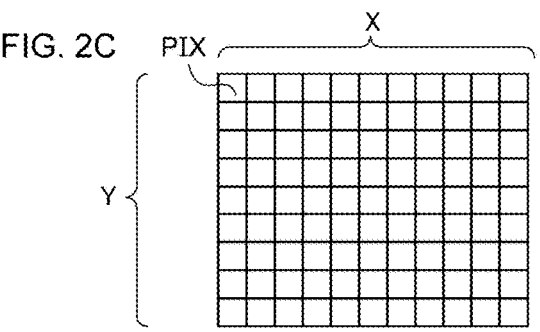

FIGS. 2A through 2C are diagrams for explaining the pixels of the DMD configured as the patterning device 114. As shown in FIG. 2A, the DMD is an array of multiple micromirrors (pixels PIX) arranged in the form of a matrix of Y rows and X columns. As shown in FIG. 2B, each pixel PIX is configured as a square-shaped mirror, and is configured to be tilted in the ON direction and the OFF direction with a hinge provided along a diagonal thereof as an axis. The patterning device 114 is configured such that all the pixels can be independently set to the on state or the off state. Description will be made below regarding the structure of the matrix in a simplified form as shown in FIG. 2C.

Returning to FIG. 1, the state of each micromirror that forms the DMD is associated with the corresponding pixel of the first image data IMG1. That is to say, when a given pixel $P_B(i,j)$ of the first image data IMG1 has a value of 1, the micromirror that corresponds to the pixel $P_B(i,j)$ is tilted toward the on side. In contrast, when the pixel $P_B(i,j)$ has a value of 0, the micromirror that corresponds to the pixel is tilted toward the off side. As a result, the light beam S0 is patterned according to the first image data IMG1 so as to generate the reference light S1 having an intensity distribution $I_r(X,Y)$. The reference light S1 thus generated is irradiated to a frontward object.

In addition to the first image data IMG1 for controlling the patterning device 114, the controller 116 generates second image data IMG2 to be used for correlation calculation. The second image data IMG2 has a second number of pixels (x×y) each of which provides m-gradation data (m 3). The second number of pixels (x×y) is smaller than the first number of pixels (X×Y). The following relations as follows hold true, in which X is an integer multiple of x and Y is an integer multiple of y.

Y=ax

Y=by (a and b each represent an integer, and at least one from among them is two or more).

In the present embodiment, the controller 116 generates the second image data IMG2, and generates the first image data IMG1 based on the second image data IMG2. The second image data IMG2 is supplied to a reconstruction processing unit 134, and is used for correlation calculation for the generation of a reconstructed image G(x,y).

The photodetector 120 receives the reflected light from the object OBJ, and outputs a detection signal $D_r$. The detection signal $D_r$ is a spatially integrated value of the light energy (or intensity) incident to the photodetector 120 when the reference light having an intensity distribution $I_r$ is irradiated to the object OBJ. Accordingly, as the photodetector 120, a single-pixel device (photodetector) may be employed. Multiple detection signals $D_1$ through $D_M$ that respectively correspond to a plurality of M intensity distributions $I_1$ through $I_M$ are output from the photodetector 120.

The processing device 130 includes the reconstruction processing unit 134. The reconstruction processing unit 134 performs calculation of the correlation between the multiple intensity distributions $I_1$ through $I_M$ defined by the multiple items of the second image data IMG2 and the multiple detection intensities $b_1$ through $b_M$, so as to generate a reconstructed image G(x,y) of the object OBJ. The pixel number of the reconstructed image, which is an image in the final stage, matches the pixel number of the second image data IMG2, which is smaller than that of the patterning device 114.

The detection intensities $b_1$ through $b_M$ are based on the detection signals $D_1$ through $D_M$. The relation between the detection intensity $b_r$ and the detection signal $D_r$ may preferably be determined giving consideration to the kind of the photodetector 120, the method employed by the photodetector 120, or the like.

Description will be made assuming that the reference light S1 having a given intensity distribution $I_r$ is irradiated over a given illumination period. Also, description will be made assuming that the detection signal $D_r$ represents the amount of received light at a given time point (or for an infinitesimal time), i.e., an instantaneous value thereof. In this case, the detection signal $D_r$ may be sampled multiple times in an illumination period. Also, as the detection intensity $b_r$, an integrated value, an average value, or the maximum value of the detection signal $D_r$ may be employed. Alternatively, from among all the sampled values, some may be selected and used to calculate such an integrated value, average value, or maximum value. For the selection of the multiple sampled values, a-th through b-th sampled values may be extracted in descending order from the maximum value. Also, sampled values that are smaller than an arbitrary threshold value may be excluded. Also, sampled values with small signal fluctuation may be extracted.

In a case in which, as the photodetector 120, a device such as a camera that is capable of setting an exposure time is employed, the output $D_r$ of the photodetector 120 may be directly used as the detection intensity $b_r$.

The conversion from the detection signal $D_r$ to the detection intensity $b_r$ may be executed by the processing device 130 or an external component of the processing device 130.

The correlation is calculated using a correlation function represented by the following Expression (1). Here, $I_r$ represents the distribution of the pixel values of the r-th second image data IMG2, and $b_r$ represents the value of the r-th detection intensity.

$$G(x, y) = \frac{1}{M} \sum_{r=1}^{M} [\{b_r - \langle b \rangle\} \cdot I_r(x, y)] \quad (1)$$

$$\langle b \rangle = \frac{1}{M} \sum_{r=1}^{M} b_r$$

The processing device 130 can be implemented as a combination of a processor (hardware component) such as a Central Processing Unit (CPU), Micro Processing Unit (MPU), microcontroller, or the like and a software program to be executed by the processor (hardware component). The processing device 130 may be configured as a combination of multiple processors. Alternatively, the processing device 130 may be configured as hardware only. The controller 116 may be implemented as an internal component of the processing device 130.

The above is the basic overall configuration of the imaging apparatus 100. Next, description will be made regarding the first image data IMG1 and the second image data IMG2.

Figure 3:
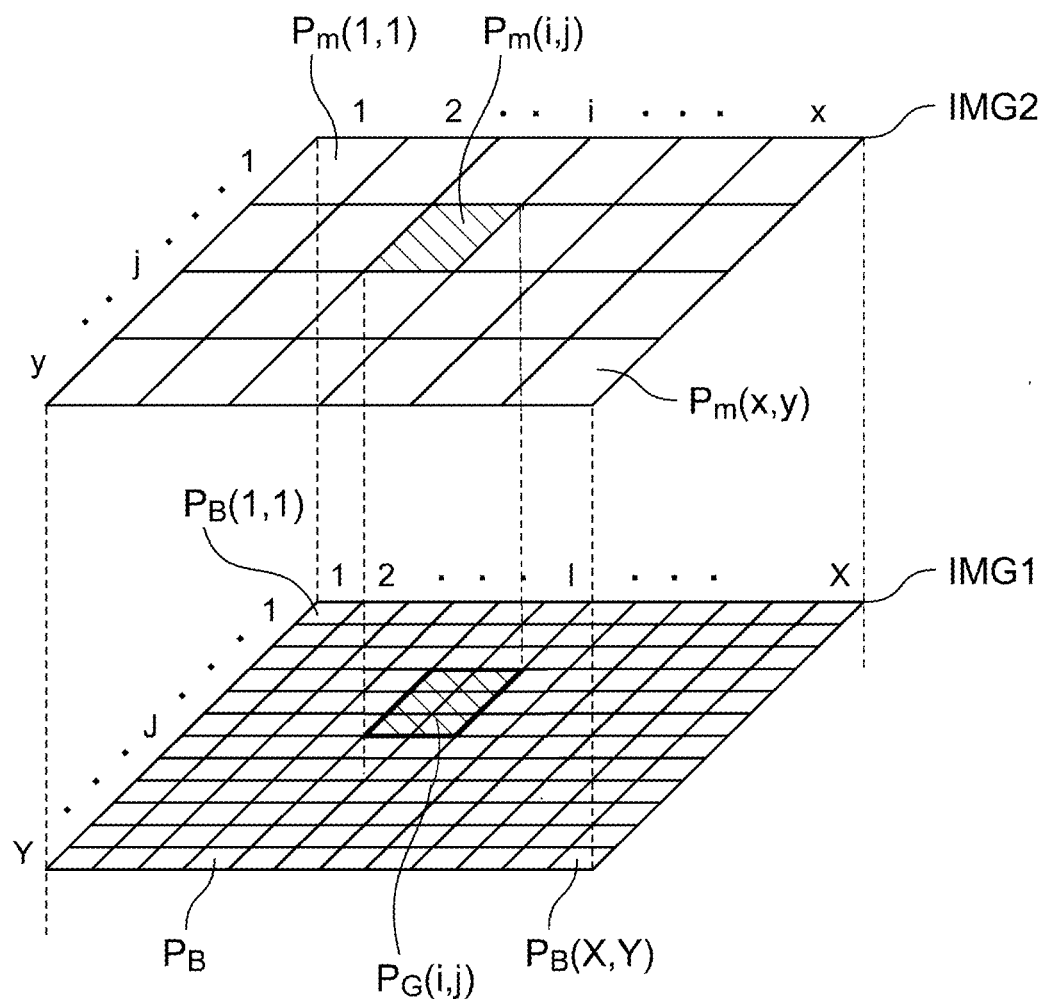
FIG. 3 is a diagram for explaining the relation between second image data and first image data.

FIG. 3 is a diagram for explaining the relation between the second image data IMG2 and the first image data IMG1. Description will be made with the pixel of the i-th row and the j-th column (i=1 to x, j=1 to y) of the second image data IMG2 as $P_m(i,j)$. Similarly, description will be made with the pixel of the I-th row and the J-th column (I=1 to X, J=1 to Y) of the first image data IMG1 as $P_B(I,J)$.

Also, description will be made with the normalized gradation value of a given pixel $P_m(i,j)$ of the second image data IMG2 as k. For example, in a case in which the second image data IMG2 is configured as two-bit data, i.e., four-gradation data, this allows the normalized gradation value k to be set to one from among four values, i.e., 0, 1/3, 2/3, and 1. In a case in which the second image data IMG2 is configured as six-gradation data, this allows the normalized gradation value k to be set to one from among six values, i.e., 0, 1/5, 2/5, 3/5, 4/5, and 1. As a generalization, in a case in which the second image data IMG2 is configured as m-gradation data (m≥3), this allows the normalized gradation value k to be set to one from among m values, i.e., 0, 1/(m−1), 2/(m−1), ..., (m−2)/(m−1), and 1.

A given pixel $P_m(i,j)$ of the second image data IMG2 is associated with a pixel group PG(i,j) including a plurality of L pixels of the first image data IMG1. Specifically, as shown in FIG. 3, when the first image data IMG1 and the second image data IMG2 are stacked in a state in which they are scaled to the same size, a given pixel $P_m(i,j)$ of the second image data overlaps a plurality of L pixels $P_B$ of the first image data IMG1. A set of the pixel $P_m(i,j)$ and the overlapping L pixels $P_B$ will be referred to as a pixel group PG(i,j).

Description will be made with the normalized gradation value of a given pixel $P_m(i,j)$ of the second image data IMG2 as k. Also, description will be made with the number of pixels having a value of 1 from among the L pixels included in the pixel group PG(i,j) that corresponds to the pixel $P_m(i,j)$ as 1. In this case, the relation l=L×k holds true. It should be noted that, when (L×k) is a non-integer, l may preferably be set to one from among (i) an integer that is closest to (L×k), (ii) an integer obtained by rounding (L×k) down to an integer, (iii) an integer obtained by rounding (L×k) up to an integer, and (iv) an integer obtained by rounding (L×k) off to an integer.

Figure 4:
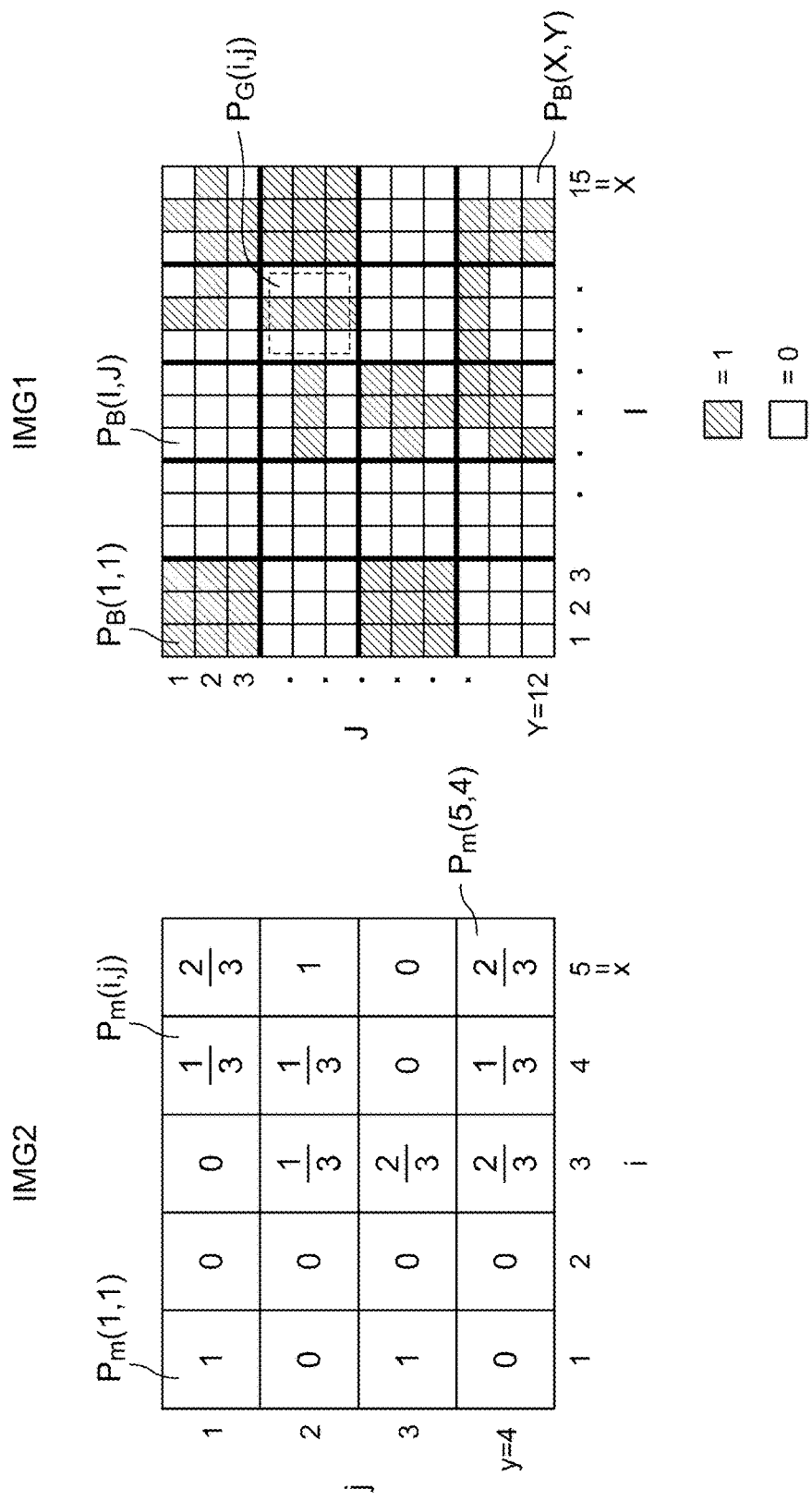
FIG. 4 is a diagram showing a specific example of the first image data and the second image data.

FIG. 4 is a diagram showing a specific example of the first image data IMG1 and the second image data IMG2. Description will be made regarding an example in which x=5, y=4, X=15, Y=12, and a=b=3, and each pixel group PG includes L (=a×b) pixels $P_B$. It should be noted that, in actuality, the number of pixels x and y is on the order of several dozen to several hundred.

In FIG. 4, the second image data IMG2 has a gradation number of four. The normalized gradation value k is set to one from among 0, 1/3, 2/3, and 1.

The pixel $P_m(1,1)$ of the second image data IMG2 has a gradation value k of 1. In this case, all the L pixels from among the L pixels of the corresponding pixel group PG(1,1) of the first image data IMG1 have a value of 1.

For example, the pixel $P_m(3,2)$ of the second image data IMG2 has a gradation value k of 1/3. In this case, the corresponding pixel group PG(3,2) of the first image data IMG1 is configured such that l (=3) pixels from among the L pixels thereof are each set to 1, and 6 pixels thereof are each set to 0.

The pixel $P_m(2,1)$ of the second image data IMG2 has a gradation value k of 0. In this case, the corresponding pixel group PG(2,1) of the first image data IMG1 is configured such that the number l of pixels having a value of 1 is 0, and all the L pixels are set to 0.

When the first image data IMG1 is viewed as an image having the same number of pixels as that of the second image data IMG2, i.e., when the first image data IMG1 is viewed as an image with each pixel group PG as a single pixel, the effective value of each pixel group PG is the average of the values of the multiple pixels included in the pixel group PG. Accordingly, the effective value of each pixel group PG is controlled in multiple gradations according to the value of the corresponding pixel $P_m$ of the second image data IMG2.

The reference light S1 thus patterned based on the first image data IMG1 is irradiated to an object, and the correlation between the detection intensity b obtained from the reflected light and the second image data IMG2 is calculated. This provides high image quality.

Figure 5:
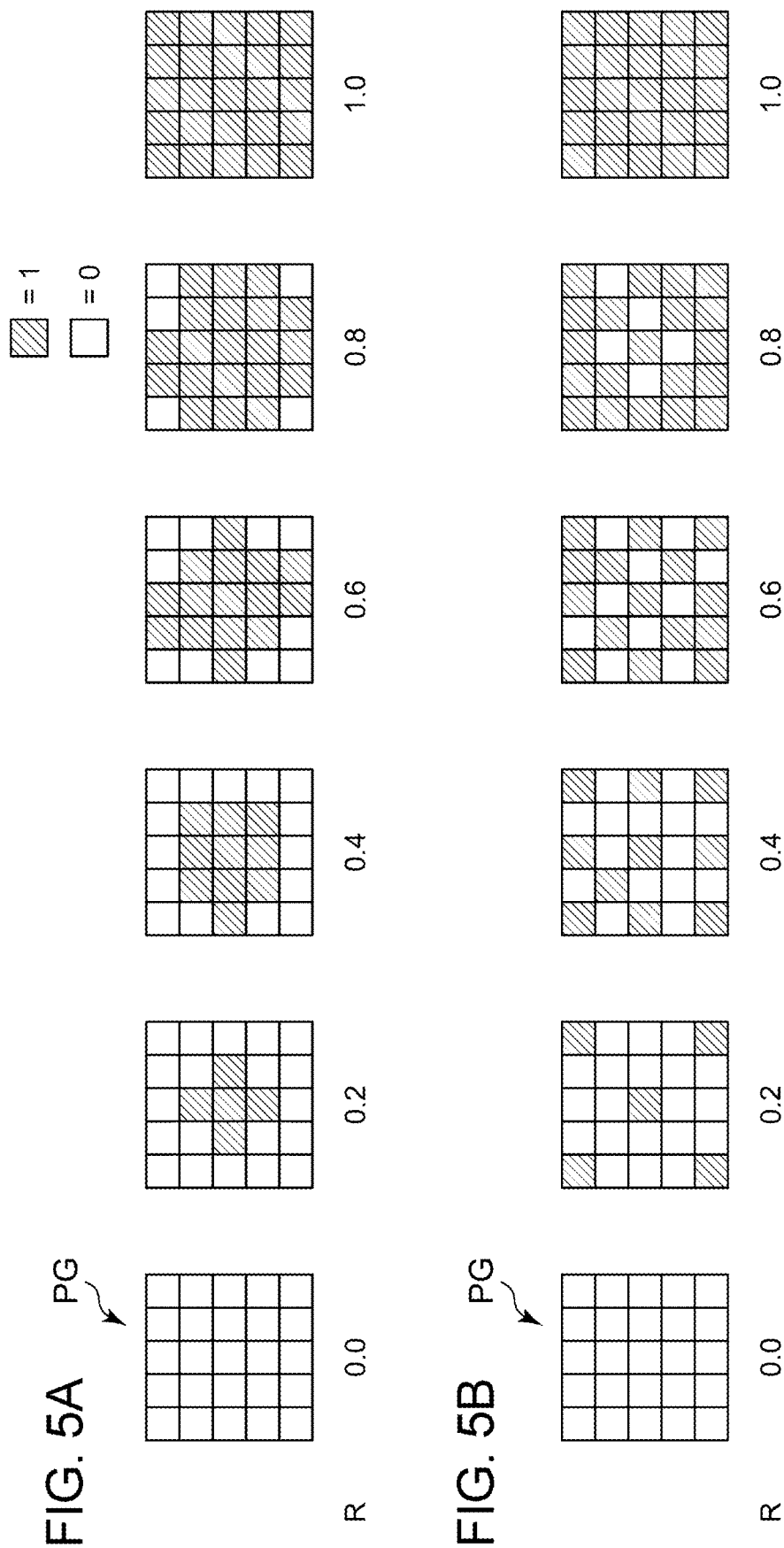
FIGS. 5A and 5B are diagrams each showing an example of a layout rule.

Description will be made regarding the layout of the values 1 and 0 in the pixel group PG. The controller 116 may arrange the values 1 and 0 in the pixel group PG according to a predetermined layout rule. FIGS. 5A and 5B are diagrams each showing an example of a layout rule. In these examples, the pixel group PG includes 25 (=5×5) pixels. A first layout rule shown in FIG. 5A is determined such that the pixels are preferentially set to 1 from the central pixels of the pixel group. In a case in which the light beam S0 generated by the light source 112 has a large light divergence angle, the light flux reflected by each pixel group PG spreads. This has the potential to cause interference between the adjacent pixel groups. In this case, with such an arrangement in which a value of 1 is concentratedly distributed in the central pixels, this allows the interference between the adjacent pixel groups to be reduced.

The second layout rule shown in FIG. 5B is determined such that a value of 1 is uniformly distributed in the pixel group PG.

Alternatively, such a layout rule may not be determined in particular. That is to say, the values 1 and 0 may be arranged at random.

The above is the configuration of the imaging apparatus 100. Next, description will be made regarding the operation of the imaging apparatus 100. The advantage of the imaging apparatus 100 can be clearly understood in comparison with a comparison technique. Description will be made regarding sensing according to the comparison technique.

In the comparison technique, the patterning device is controlled based on m-gradation image data having a pixel number (x×y). Furthermore, the correlation calculation is controlled based on the same image data, i.e., the m-gradation image data having the pixel number (x×y).

Figure 6:
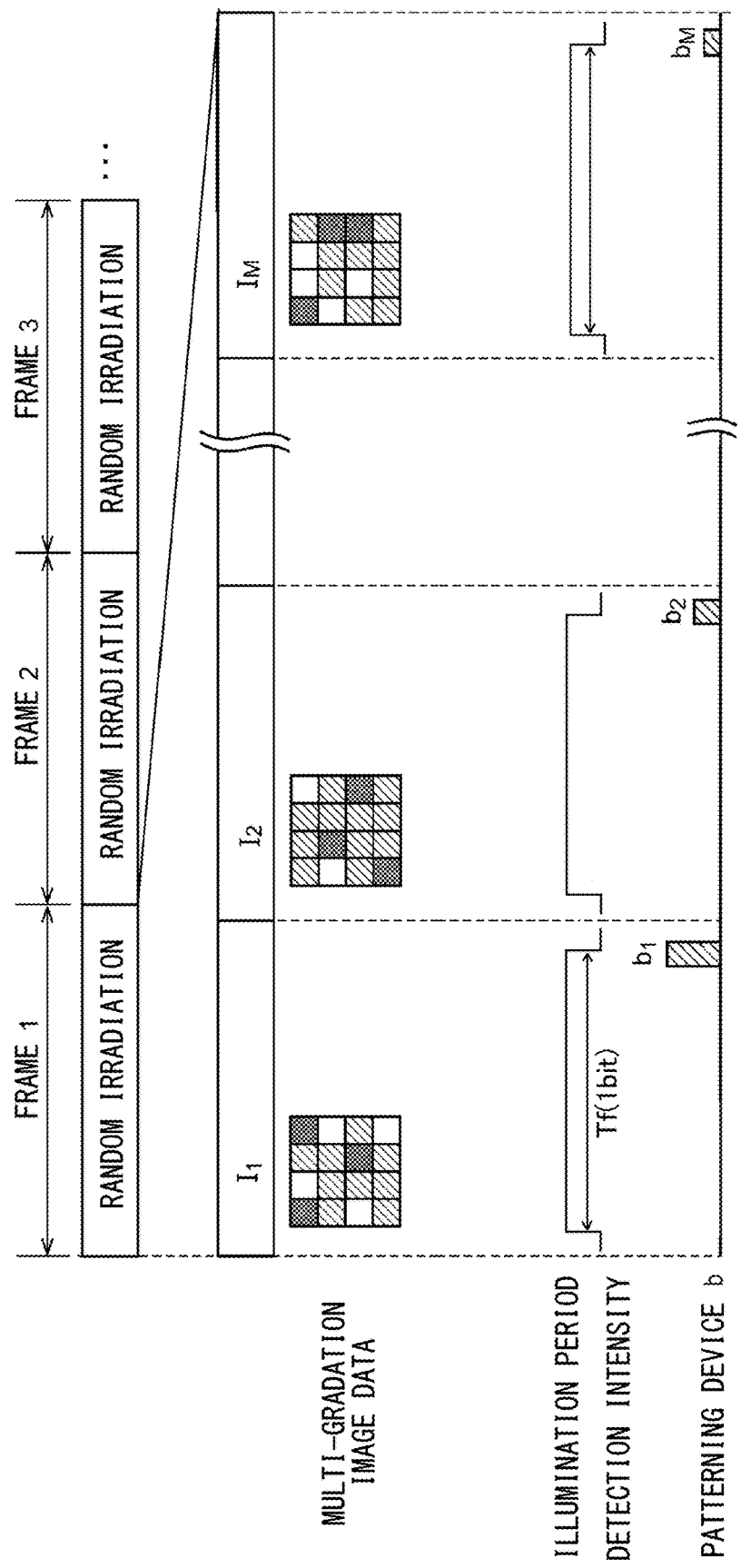
FIG. 6 is a time chart showing the sensing of one frame by the imaging apparatus according to a comparison technique.

FIG. 6 is a time chart showing the sensing of one frame by an imaging apparatus according to a comparison technique. In order to generate a single reconstructed image G(x,y), pattern irradiation is performed M times. In the comparison technique, multi-gradation image data is used for the correlation calculation. In this case, the effective number of pixels of the patterning device is the same as the number of pixels of the image data. The patterning device operates in a multi-gradation mode (multi-bit mode).

As shown in FIG. 2, the DMD is configured to allow each pixel (micromirror) thereof to be set to two states, i.e., an on state and an off state. Accordingly, a multi-gradation DMD is configured to switch each pixel between the on state and the off state at high speed. By changing the time ratio (duty ratio) between the on state and the off state, such an arrangement supports multi-gradation control. This leads to a problem in that the multi-gradation-mode DMD involves an increase of the frame period as compared with a single-bit-mode DMD.

Accordingly, with the comparison technique, this leads to an increased irradiation time of the reference light S1 based on a single item of the image data. After the completion of the first irradiation of the reference light S1, the detection intensity $b_1$ is obtained, following which the flow transits to the second irradiation of the reference light S1. After the completion of the M irradiations and the detection intensities $b_1$ through $b_M$ are acquired, the correlation calculation is performed so as to obtain the reconstructed image G(x,y). As the irradiation time of the reference light S1 becomes longer, the time required to generate a single reconstructed image G(x,y) becomes longer.

Figure 7:
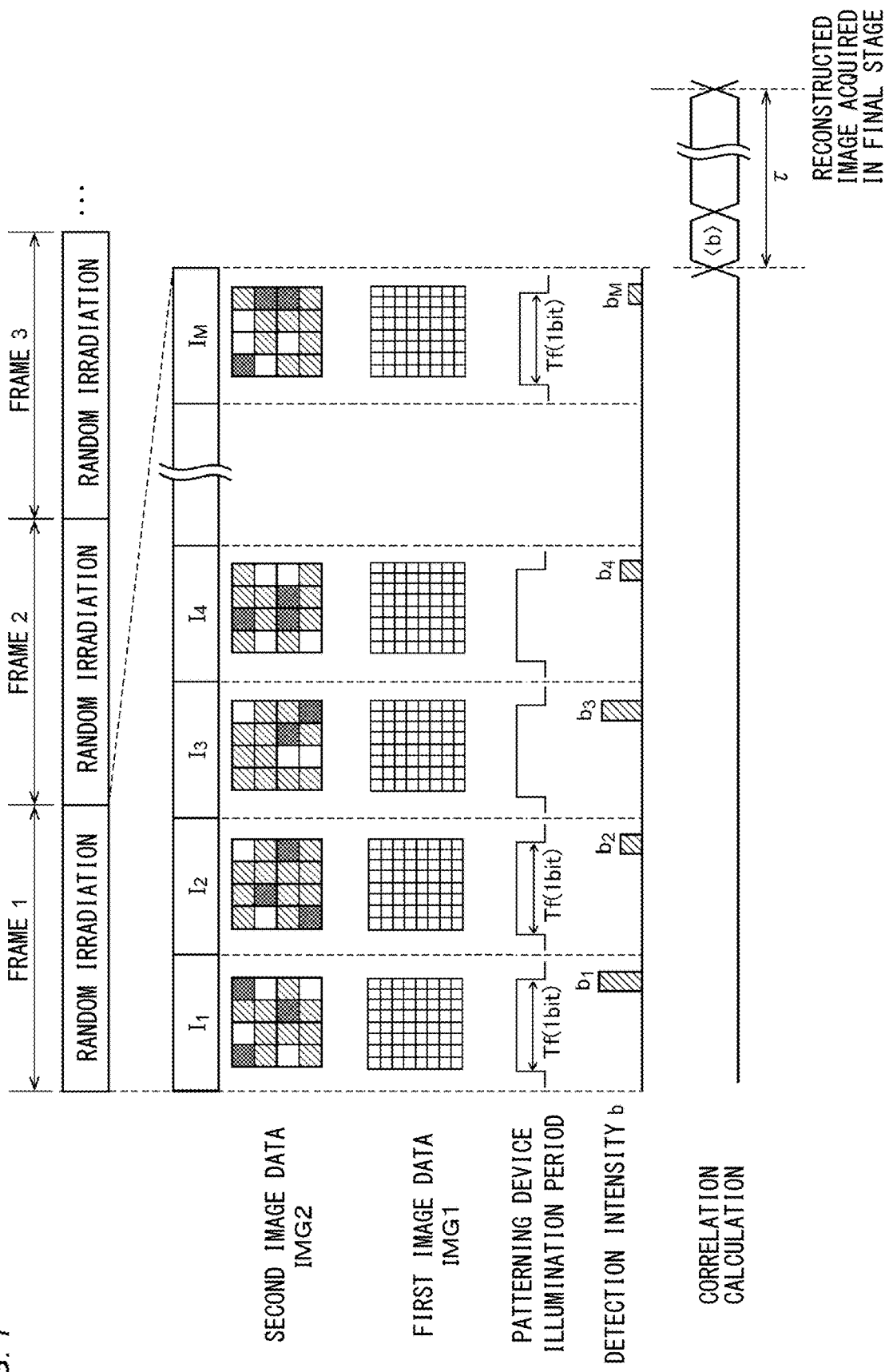
FIG. 7 is a time chart showing the sensing of one frame by the imaging apparatus shown in FIG. 1.

Next, description will be made regarding the imaging apparatus 100 shown in FIG. 1. FIG. 7 is a time chart showing the sensing of one frame by the imaging apparatus 100 shown in FIG. 1. In the present embodiment, the second image data IMG2 with multi-gradation data having a small number of pixels is used for the correlation calculation. In contrast, the patterning device 114 uses the first image data configured as two-gradation image data IMG1 having a large number of pixels.

With the present embodiment, the patterning device 114 operates in a single-bit mode. Accordingly, such an arrangement does not require duty ratio control as employed in a multi-gradation mode. Accordingly, the illumination time required for the DMD to provide one irradiation of the reference light S1 is shorter than that in the comparison technique. As a result, this allows the time required for the generation of a single reconstructed image G(x,y) to be reduced as compared with the comparison technique, thereby providing an increased frame rate.

Figures 8, 9:
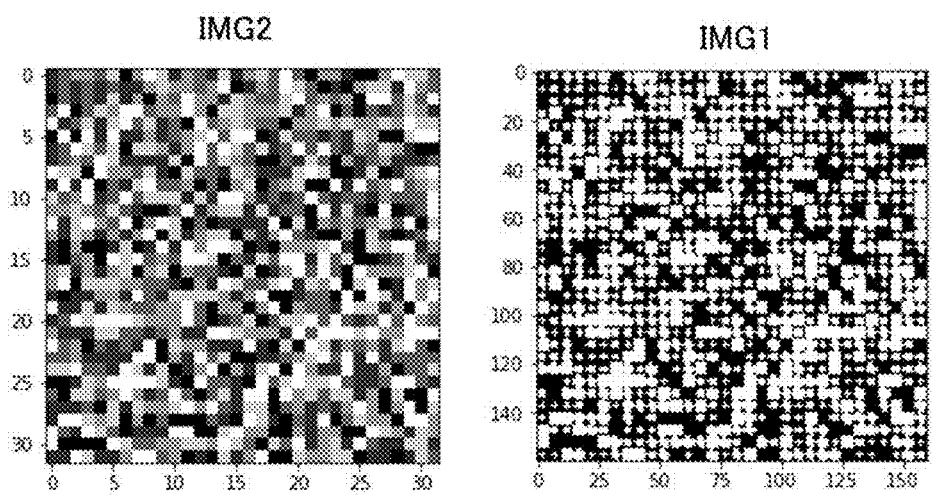
FIG. 8 is a diagram showing an example of the second image data and the first image data.
FIG. 9 is a diagram showing a simulation result.

Also, with the embodiment 1, the intensity distribution of the reference light S1 is controlled in multiple gradations in units of the pixel group PG. This provides an equivalent image quality as that of the comparison technique. Description will be made regarding a simulation for evaluating this effect. The simulation was performed with x=y=32, and X=Y=640. Furthermore, the second image data IMG2 was simulated as six-gradation (m=6) image data. FIG. 8 is a diagram showing an example of the second image data IMG2 and the first image data IMG1.

FIG. 9 is a diagram showing the simulation results. The simulation was performed four different ways, i.e., M=1000, M=5000, M=10000, and M=50000. The upper diagram shown in FIG. 9 shows the results obtained with respect to the comparison technique. The center diagram shown in FIG. 9 shows the results obtained in a case in which the first layout rule is employed using the method according to the embodiment 1. The lower diagram shown in FIG. 9 shows the results obtained in a case in which the second layout rule is employed using the method according to the embodiment 1. It can be understood that, with the present embodiment, this provides the same image quality as that of the comparison technique.

That is to say, with the imaging apparatus 100 according to the embodiment 1, this provides both high image quality and a high frame rate.

Next, description will be made regarding a modification relating to the embodiment 1.

Modification 1.1

Description has been made in the embodiment regarding an arrangement in which the second image data IMG2 is formed of pixels having a uniform pixel size and a uniform shape. Also, the pixels may be designed to have non-uniform pixel sizes and non-uniform shapes. That is to say, the pixel size may be locally increased or reduced. FIGS. 10A through 10C are diagrams each showing the second image data IMG2 according to a modification 1.1. For example, in a case in which the reconstructed image is required to have a high resolution in its central portion, as shown in FIG. 10A, the second image data IMG2 may preferably be designed such that its central pixels have a small pixel size. In a case in which the reconstructed image is required to have a high resolution in its lower portion, as shown in FIG. 10B, the second image data IMG2 may preferably be designed such that its lower pixels have a small pixel size. Also, as shown in FIG. 10C, the second image data IMG2 may have rectangular pixels.

Modification 1.2

Description has been made in the embodiment regarding an arrangement in which, after the second image IMG2 is generated, the second image data IMG2 thus generated is converted into the first image data IMG1. Also, the execution order may be switched. That is to say, after the first image data IMG1 is generated as two-gradation one-bit image data having the first number of pixels (X×Y) arranged at random, the first image data IMG1 thus generated may be converted into the second image data IMG2. In this case, when the number of pixels having a value of 1 included in a given pixel group PG(i,j) having L pixels is l, the value (normalized value) of the corresponding pixel $P_m(i,j)$ of the second image data IMG1 may preferably be set to l/L.

FIG. 11 is a diagram showing the first image data IMG1 and the second image data IMG2 according to a modification 1.2. As shown in FIG. 11, such an arrangement is capable of generating multiple items of the second image data IMG2 having different combinations of the number of pixels and the gradation number from the two-gradation first image data IMG1 having the number of pixels (X×Y). In other words, this allows the resolution of the reconstructed image G(x,y) to be changed in a flexible manner even after the detection intensities $b_1$ through $b_M$ are acquired.

Embodiment 2

Figure 12:
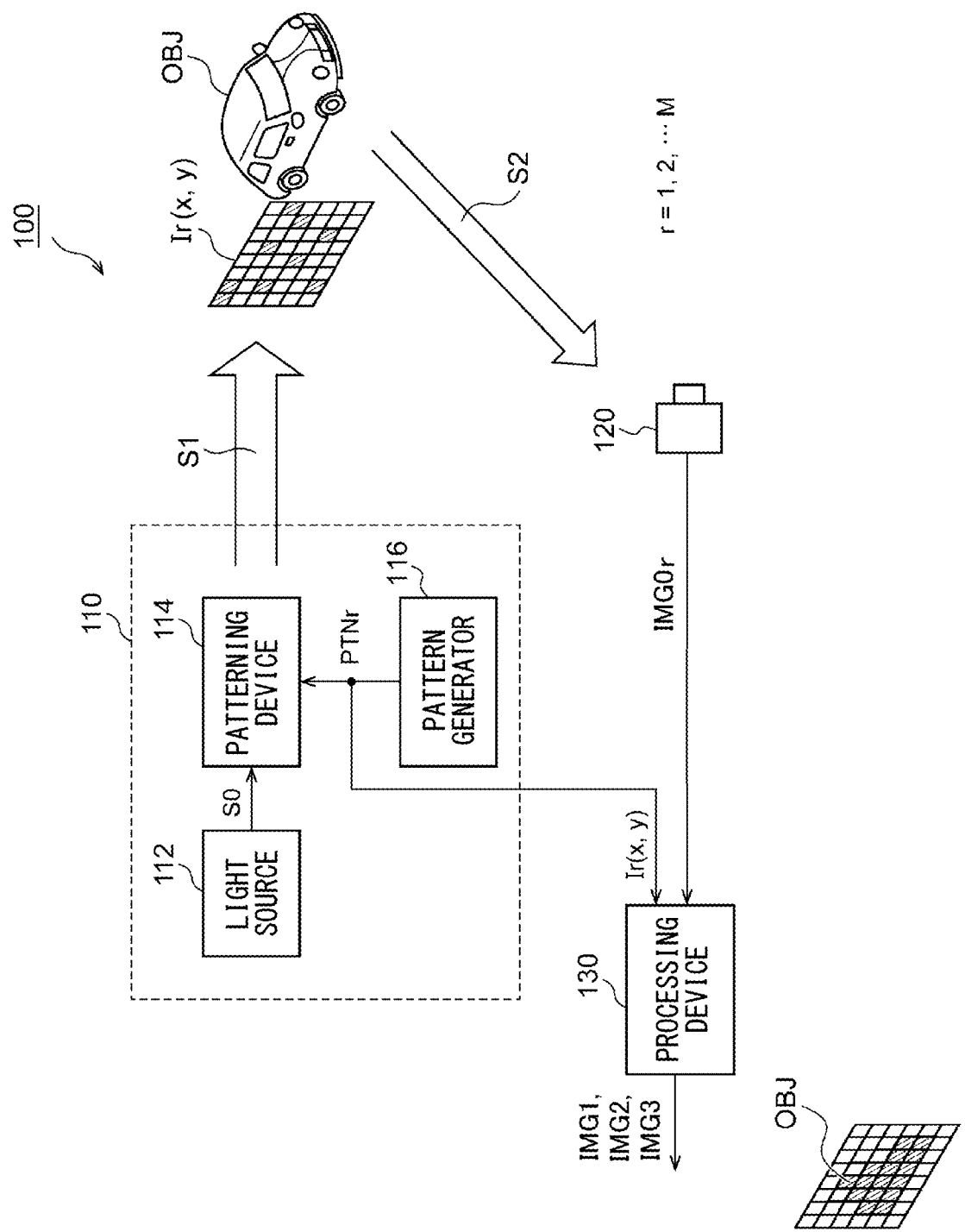
FIG. 12 is a diagram showing an imaging apparatus according to an embodiment 2.

FIG. 12 is a diagram showing an imaging apparatus 100 according to an embodiment 2. The imaging apparatus 100 includes an illumination apparatus 110, a two-dimensional image sensor 120, and a processing device 130.

The imaging apparatus 100 is configured to be switchable between three modes (first mode through third mode).

The illumination apparatus 110 irradiates infrared reference light S1 having a controllable intensity distribution to an object. For example, the illumination apparatus 110 includes a light source 112, a patterning device 114, and a pattern generator 116. The light source 112 generates a light beam S0 having a uniform intensity distribution. As the light source 112, a laser, a light-emitting diode, or the like, may be employed. The wavelength and the spectrum of the reference light S1 are not restricted in particular. In the present embodiment, infrared light is employed as the reference light S1.

The patterning device 114 has multiple pixels arranged in a matrix. The patterning device 114 is configured to be capable of spatially modulating the light intensity distribution I based on the combination of the on/off states of the multiple pixels. In the present specification, a pixel set to the on state will be referred to as an "on pixel". On the other hand, a pixel set to the off state will be referred to as an "off pixel". It should be noted that, in the following description, for ease of understanding, description will be made assuming that each pixel is settable to only two values, i.e., 1 and 0. However, the present disclosure is not restricted to such an arrangement. Also, each pixel may be settable to an intermediate value.

As the patterning device 114, a reflective Digital Micromirror Device (DMD) or a transmissive liquid crystal device may be employed. The patterning device 114 receives the supply of patterning data signal PTN (image data) generated by the pattern generator 116.

The pattern generator 116 generates patterning data $PTN_r$ that specifies the intensity distribution $I_r$ of the reference light S1. There is a difference in the operation of the pattern generator 116 and the patterning data $PTN_r$ between the modes. The pattern generator 116 may be implemented as an internal component of the processing device 130.

The two-dimensional sensor 120 is sensitive to the infrared range and the visible light range. The two-dimensional image sensor 120 is configured as a Complementary Metal Oxide Semiconductor (CMOS) sensor or a Charge Coupled Device (CCD).

The processing device 130 processes an image IMG0 captured by the two-dimensional image sensor 120. The processing device 130 can be implemented as a combination of a processor (hardware component) such as a Central Processing Unit (CPU), Micro Processing Unit (MPU), microcontroller or the like and a software program to be executed by the processor (hardware component). The processing device 130 may be configured as a combination of multiple processors. Alternatively, the processing device 130 may be configured as hardware only.

Next, description will be made regarding the first mode through the third mode.

First Mode

In the first mode, the imaging apparatus 100 operates as a quantum radar. The illumination apparatus 110 operates as a pseudo-thermal light source. The illumination apparatus 110 generates reference light S1 having an intensity distribution I(x, y) that can be regarded as substantially random, and irradiates the reference light S1 to an object OBJ. In the first mode, the pattern generator 116 generates a sequence of M items of substantially random patterning data $PTN_1$ through $PTN_M$. Accordingly, the reference light S1 is irradiated to the object OBJ while changing the intensity distribution according to the sequence of the plurality of M items of patterning data $PTN_1$ through $PTN_M$.

The two-dimensional image sensor 120 captures multiple images $IMG0_1$ through $IMG_M$ corresponding to the M irradiations of the reference light S1 based on the multiple items of patterning data $PTN_1$ through $PTN_M$. In the first mode, only infrared light is incident to the two-dimensional image sensor 120. The visible light is removed by a filter.

For example, the imaging apparatus 100 may be provided with a visible light filter and an infrared filter provided on an incident light path of the two-dimensional sensor 120. The visible light filter and the infrared filter may be swapped in a mechanical manner according to the mode.

Alternatively, the imaging apparatus 100 may include a light path via which the incident light enters the two-dimensional image sensor 120 after it passes through the visible light filter and a light path via which the incident light enters the two-dimensional image sensor 120 after it passes through the infrared filter. Also, the imaging apparatus 100 may be configured to be capable of selectively setting the light path according to the mode. Alternatively, a variable wavelength filter may be employed. In this case, the transmission wavelength may be controlled according to the mode.

The processing device 130 calculates the light detection intensities $b_1$ through $b_M$ that correspond to integrated values calculated over multiple pixels for the multiple images $IMG0_1$ through $IMG0_M$. More typically, the processing device 130 may integrate (or average) the values of all the pixels of each image $IMG0_r$, so as to calculate each light detection intensity $b_r$.

Subsequently, the processing device 130 calculates the correlation between the multiple items of patterning data $PTN_1$ through $PTN_M$ and the multiple light detection intensities $b_1$ through $b_M$ that correspond to the multiple images $IMG0_1$ through $IMG0_M$, so as to generate a reconstructed image G(x,y).

The correlation is calculated using a correlation function represented by the following Expression (1). Here, $I_r$ represents the r-th intensity distribution, and $b_r$ represents the value of the r-th detection intensity.

$$G(x, y) = \frac{1}{M}\sum_{r=1}^{M} [\{b_r - \langle b \rangle\} \cdot I_r(x, y)] \quad (1)$$

$$\langle b \rangle = \frac{1}{M}\sum_{r=1}^{M} b_r$$

The processing device 130 outputs a first output image IMG1 based on the reconstructed image G(x,y).

(ii) Second Mode

The processing device 130 is configured to output a second output image IMG2 based on the image IMG0 captured by the two-dimensional image sensor 120. More specifically, the illumination apparatus 100 is configured to irradiate the infrared reference light S1 having a uniform intensity distribution. The two-dimensional image sensor 120 operates as an active sensor that detects reflected light S2 of the reference light S1 from the object OBJ. In the second mode, only the infrared light is incident to the two-dimensional image sensor 120, and the visible light is removed by a filter. In the second mode, the imaging apparatus 100 operates as a night-vision camera.

(iii) Third Mode

The processing device 130 is configured to output a third output image IMG3 based on the image IMG0 captured by the two-dimensional image sensor 120. There is a difference in the operation of the illumination apparatus 110 between the third mode and the second mode. In the third mode, the illumination apparatus 110 stops emitting light. Furthermore, in the third mode, only the visible light is incident to the two-dimensional image sensor 120, and the infrared light is removed by a filter. That is to say, in the third mode, the imaging apparatus 100 operates as a passive sensor for visible light, i.e., an ordinary camera.

The processing device 130 is configured to be capable of judging whether the visibility is good or poor. The good/poor visibility judgment method is not restricted in particular. The processing device 130 may judge based on external information whether the visibility is good or poor. For example, the processing device 130 may acquire fog occurrence information from a sensor installed in transportation infrastructure such as a traffic light or the like. Also, the processing device 130 may acquire semi-dynamic information (local weather information) of a dynamic map.

Alternatively, the processing device 130 may process the image IMG0 captured by the two-dimensional image sensor 120, so as to judge the quality of the visibility. Examples of the good/poor visibility judgment method include: (i) a classifying method based on machine learning; (ii) a method for judging the visibility based on a white line distance that can be detected; and (iii) a judgment method based on the relation between the distance information with respect to a leading vehicle and the luminance. Alternatively, the visibility may be judged based on the uniformity and the size of water droplets.

Alternatively, images may be captured in the same situation in each mode switched between the first mode and the second mode. The quality of the visibility may be judged based on a difference between images IMG1 and IMG2 acquired in the respective modes.

Alternatively, the processing device 130 may judge the quality of the visibility based on an instruction input by the driver.

Alternatively, the imaging apparatus 100 may be provided with a sensor that is capable of providing information for judging the quality of the visibility. The processing device 130 may judge the quality of the visibility based on the output of the sensor. For example, the reflected light intensity may be detected using a sensor after pulsed light is irradiated. Also, a transmissometer may be employed.

In addition to the quality of the visibility, the processing device 130 is configured to be capable of judging the brightness of the surroundings. For example, the processing device 130 is coupled to an unshown illuminance sensor. The processing device 130 may judge the brightness based on an output of the illuminance sensor. Also, the brightness of the surroundings may be judged based on the time of day or GPS information.

Figures 13, 14:
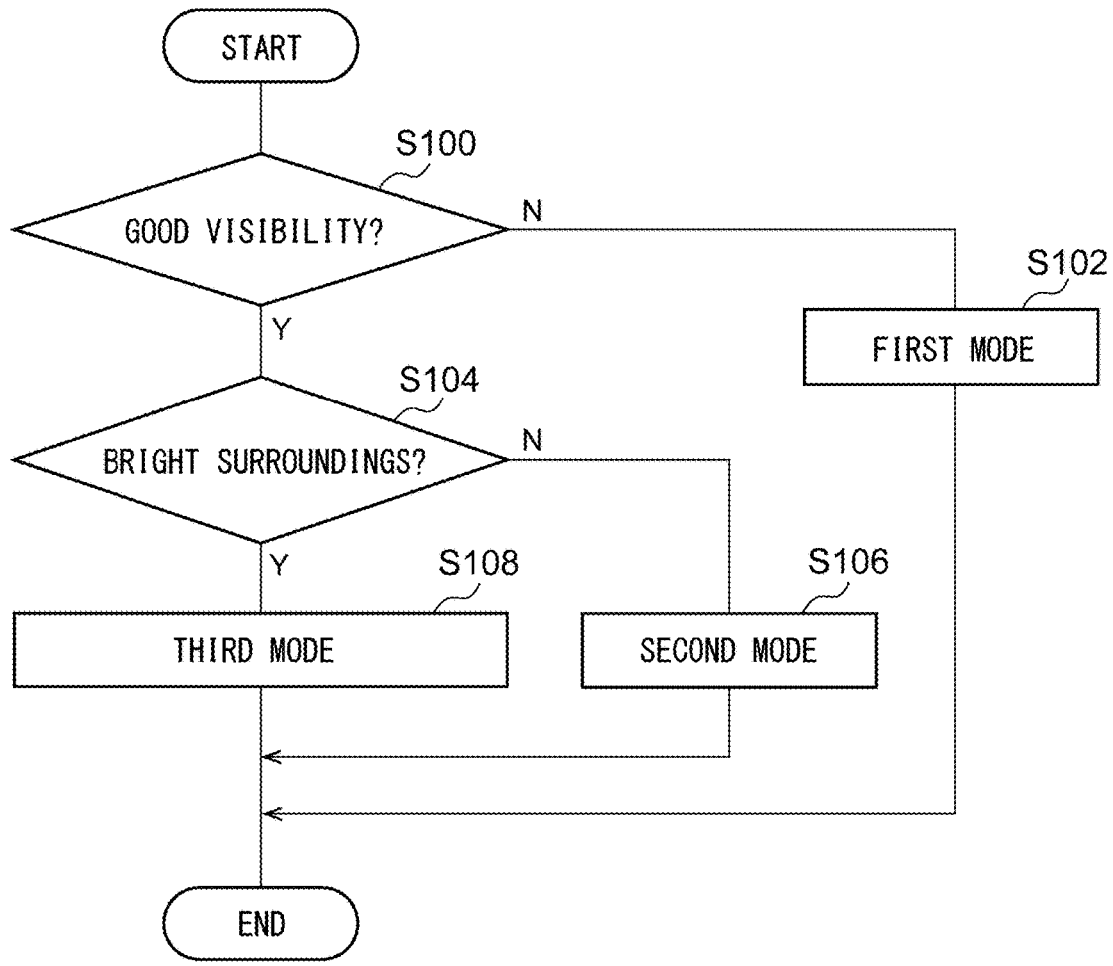
FIG. 13 is a flowchart showing the operation of the imaging apparatus shown in FIG. 12.
FIG. 14 is a diagram showing the state and the processing of the illumination apparatus, the two-dimensional image sensor, and the processing device in the first mode, the second mode, and the third mode.

A mode is selected from among the first mode through the third mode described above based on the quality of the visibility and the brightness of the surroundings. FIG. 13 is a flowchart showing the operation of the imaging apparatus 100 shown in FIG. 12.

The quality of the visibility is judged (S100). When the visibility is poor (NO in S100), the first mode is selected (S102). In this case, the imaging apparatus 100 operates as a quantum radar.

When the visibility is good (YES in S100), the brightness of the surroundings is judged (S104). When judgment has been made that the surroundings are dark (NO in S104), the second mode is selected (S106). In this case, the imaging apparatus 100 operates as a night-vision camera. When judgment has been made that the surroundings are bright (YES in S104), the third mode is selected (S108). In this case, the imaging apparatus 100 operates as an ordinary visible-light camera.

FIG. 14 is a diagram showing the states and the processing of the illumination apparatus 110, the two-dimensional image sensor 120, and the processing device 130 in the first mode, the second mode, and the third mode. In the first mode, the illumination apparatus 110 irradiates reference light having a random intensity distribution. The two-dimensional image sensor 120 has a detection wavelength in the infrared range, which is the same as the reference light. The two-dimensional image sensor 120 combines all the pixels, thereby operating as a virtual single-pixel photodetector. The processing device 130 reconstructs an image using correlation calculation.

In the second mode, the illumination apparatus 110 irradiates reference light having a uniform intensity distribution. The two-dimensional image sensor 120 has a detection wavelength in the infrared range, which is the same as the reference light. The two-dimensional image sensor 120 captures an image of the infrared reflected light from an object.

In the third mode, the illumination apparatus 110 is turned off. In this mode, the two-dimensional image sensor 120 has a detection wavelength in the visible light range. That is to say, the two-dimensional image sensor 120 captures an image of reflected light from an object due to ambient light (mainly sunlight).

The above is the operation of the imaging apparatus 100. With the imaging apparatus 100, in a poor visibility state, the first mode is selected so as to operate the imaging apparatus 100 as a quantum radar. This allows the imaging apparatus 100 to detect an object even when it is difficult for an ordinary camera to detect such an object. Conversely, in a good visibility state, the second mode or the third mode is selected. This allows an image to be generated at a high frame rate. That is to say, the imaging apparatus 100 has both the advantages of a quantum radar and a two-dimensional image sensor.

Furthermore, this allows an unshown optical system to be shared by the first mode through the third mode, thereby allowing hardware costs to be reduced. Moreover, this allows an image to be captured with the same angle of view regardless of the mode from among the three modes. In addition, this arrangement has an advantage of no parallax between the three modes.

Next, description will be made regarding a hybrid mode. The imaging apparatus 100 is capable of supporting a hybrid mode that is a combination of the first mode and the second mode.

Figure 15A:
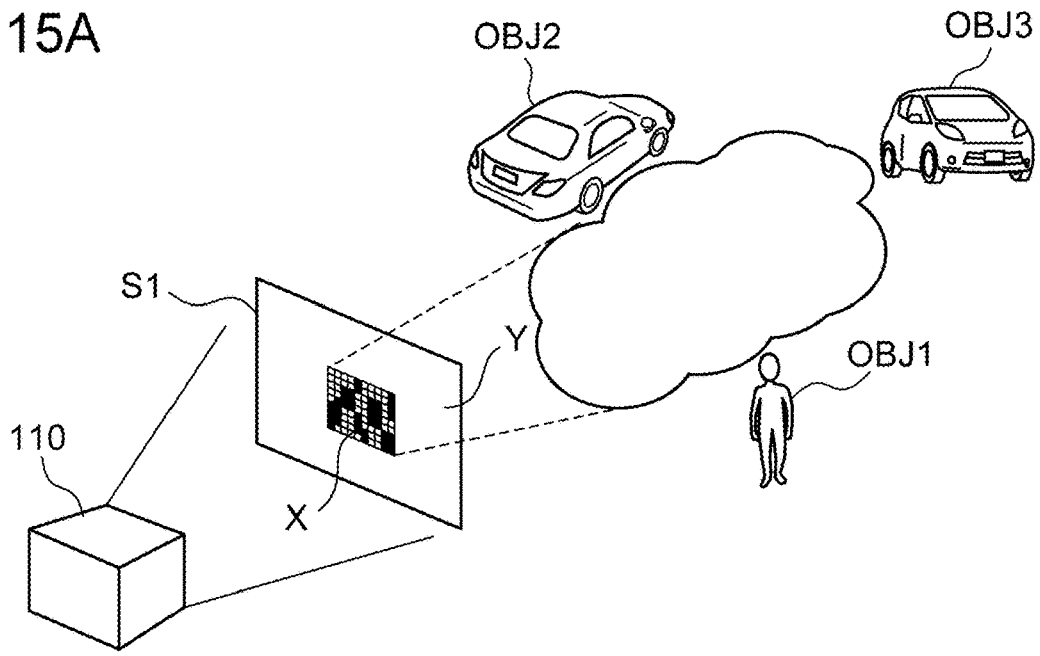
FIGS. 15A through 15C are diagrams for explaining a hybrid mode.
Figure 15B:
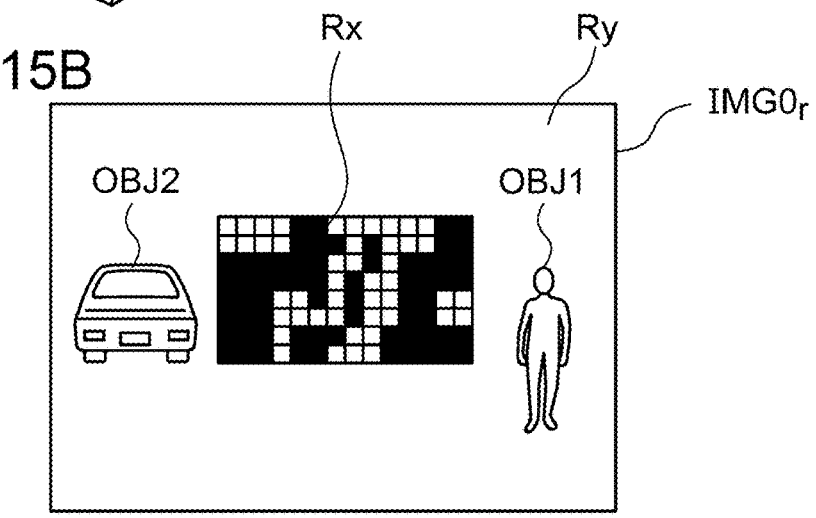
Figure 15C:
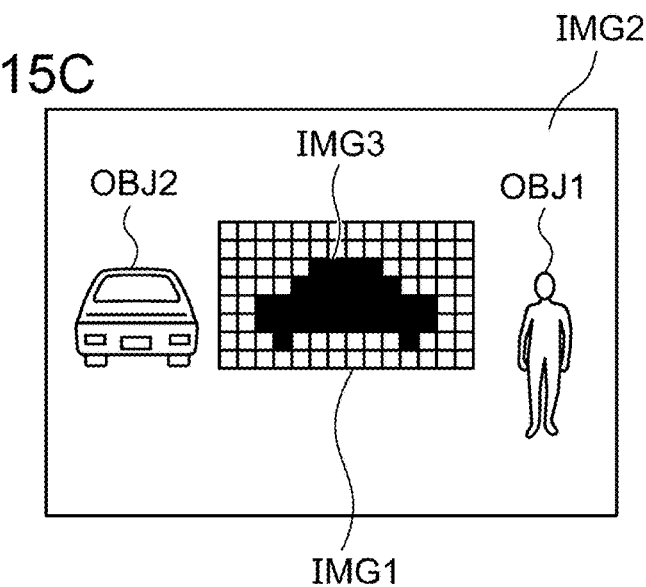

FIGS. 15A through 15C are diagrams for explaining the hybrid mode. FIG. 15A shows an example of a traveling situation employing the hybrid mode. In this example, the visibility partially becomes poor in a central region due to the occurrence of fog. However, high visibility is obtained in the other regions. The imaging apparatus 100 operates in the first mode with respect to the poor-visibility region. In contrast, the imaging apparatus 100 operates in the second mode with respect to the high-visibility region.

In the hybrid mode, the illumination apparatus 110 randomly changes the intensity distribution of the reference light S1 for the first portion X. On the other hand, the illumination apparatus 100 irradiates the reference light S1 with a uniform and fixed intensity distribution for the second portion Y.

FIG. 15B is a diagram showing an image $IMG0_r$ captured by the two-dimensional image sensor 120. The single image $IMG0_r$ includes a region Rx that corresponds to the first portion X obtained by capturing an image of reflected light from an object OBJ3 due to the reference light S1 having a random intensity distribution.

On the other hand, directing attention to the region Ry that corresponds to the second portion Y of the image $IMG0_r$, images of the objects OBJ1 and OBJ2 in front of the imaging apparatus 100 are captured due to the reflection of the uniform reference light S0. That is to say, the region Ry is captured by an ordinary night-vision camera.

The processing device 130 performs the correlation calculation described in the first mode for the irradiation region Rx of the image $IMG0_r$ that corresponds to the first portion X of the reference light S1 for each of multiple images $IMG0_1$ through $IMG0_M$, so as to reconstruct the first output image IMG1=G(x, y). That is to say, the pixel values of the irradiation region Rx are integrated for each image $IMG0_r$ so as to calculate the light detection intensity $b_r$. Subsequently, the correlation calculation is performed based on Expression (1) so as to reconstruct the first output image G(x, y).

FIG. 15C shows an image IMG4 obtained as a final-stage image in the hybrid mode. The image IMG4 includes the first output image G(x, y) in its central portion, and the second output image IMG2 in its peripheral portions. The first output image G(x, y) includes an image of the object OBJ3 that exists on the other side of the fog.

As described above, with the hybrid mode, such an arrangement is capable of operating as a quantum radar for only a poor-visibility region and of operating as a night-vision camera for a good-visibility region in a situation in which poor visibility occurs in a portion of the front side.

It should be noted that the hybrid mode may be supported as a combination of the first mode and the third mode. In this case, the reference light S1 is irradiated with an intensity of zero for the second portion Y.

Next, description will be made regarding modifications relating to the embodiment 2.

Modification 2.1

Description has been made in the embodiment 2 regarding an arrangement in which the illumination apparatus 110 is configured as a combination of the light source 112 and the patterning device 114. However, the present invention is not restricted to such an arrangement. For example, the illumination apparatus 110 may be configured as an array of multiple semiconductor light sources (light-emitting diodes (LEDs) or laser diodes (LDs)) in a matrix. Furthermore, the illumination apparatus 110 may be configured to be capable of controlling the on/off states (or luminance) of each semiconductor light source.

Modification 2.2

Description has been made in the embodiment regarding an arrangement that supports the first through third modes. Also, the imaging apparatus 100 may support only the first mode and the second mode, or may support only the first mode and the third mode.

Modification 2.3

When the imaging apparatus 100 operates in the first mode (or in the hybrid mode), if pixel value saturation occurs in a portion of the image IMG0 captured by the two-dimensional image sensor 120, the correlation calculation may be performed after the saturated pixels are excluded. With the ghost imaging using a single-pixel photodetector according to a conventional technique, when saturation occurs in the output of the photodetector, such an arrangement has a problem in that the image cannot be reconstructed. In contrast, with the quantum radar employing the two-dimensional image sensor 120 in which the saturated pixels are excluded, this allows a reconstructed image to be obtained for the other portions.

Modification 2.4

Description has been made in the embodiment regarding an arrangement in which, in the third mode, the two-dimensional image sensor 120 captures a visible-light image. However, the present invention is not restricted to such an arrangement. Instead, the two-dimensional image sensor 120 may capture an infrared image. That is to say, the imaging apparatus 100 may be operated as an infrared passive sensor.

Modification 2.5

The switching of the multiple modes may be operated manually by the driver.

Modification 6

Alternatively, the multiple modes (the first mode through the third mode) may be periodically and automatically switched regardless of the brightness of the surroundings, the presence or absence of fog, etc.

Usage

Figure 16:
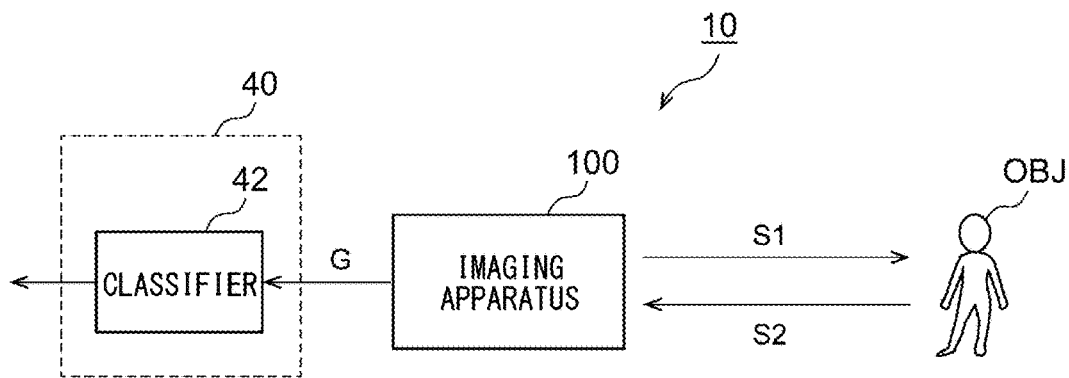
FIG. 16 is a block diagram showing an object identification system.

Next, description will be made regarding the usage of the imaging apparatus 100. FIG. 16 is a block diagram showing an object identification system 10. The object identification system 10 is mounted on a vehicle such as an automobile, motorcycle, or the like. The object identification system 10 judges the kind (category) of an object OBJ that exists in the vicinity of the vehicle.

The object identification system 10 includes the imaging apparatus 100 and a processing device 40. As described above, the imaging apparatus 100 irradiates the reference light S1 to the object OBJ, and receives the reflected light S2, so as to generate a reconstructed image G.

The processing device 40 processes the output image G output from the imaging apparatus 100, and judges the position and the kind (category) of the object OBJ.

A classifier 42 included in the processing device 40 receives the image G as its input, and judges the position and the kind of the object OBJ included in the image G. The classifier 42 is implemented based on a model generated by machine learning. The algorithm employed by the classifier 42 is not restricted in particular. Examples of algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The above is the configuration of the object identification system 10. With such an arrangement employing the imaging apparatus 100 as a sensor of the object identification system 10, this provides the following advantages.

With such an arrangement employing the imaging apparatus 100, i.e., a quantum radar camera, this provides dramatically improved noise resistance. For example, when the vehicle travels in rain, snow, or fog, it is difficult to recognize the object OBJ with the naked eye. In contrast, with such an arrangement employing the imaging apparatus 100, this allows a reconstructed image G of the object OBJ to be acquired without the effects of rain, snow, or fog.

Figure 17:
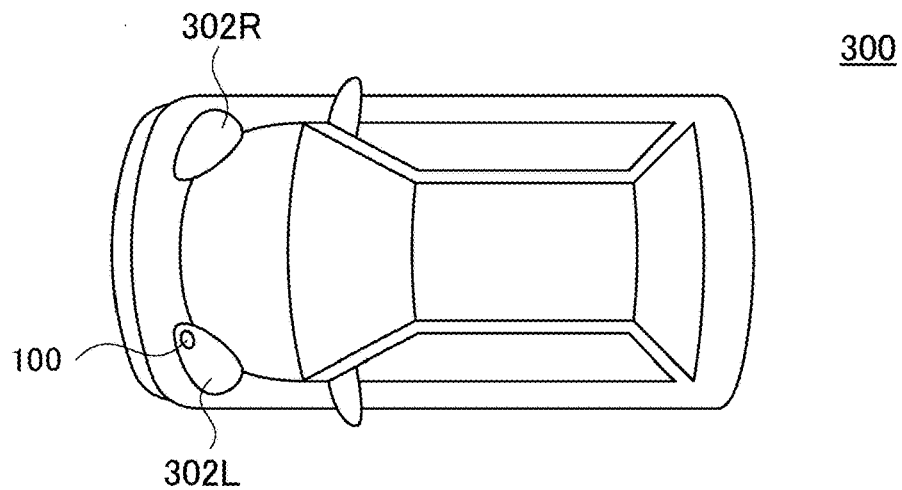
FIG. 17 is a diagram showing an automobile provided with the object identification system.

FIG. 17 is a diagram showing an automobile provided with the object identification system 10. An automobile 300 is provided with headlamps 302L and 302R. The imaging apparatus 100 is built into at least one from among the headlamps 302L and 302R. Each headlamp 302 is positioned at a frontmost end of the vehicle body, which is most advantageous as a position where the imaging apparatus 100 is to be installed for detecting an object in the vicinity.

Figure 18:
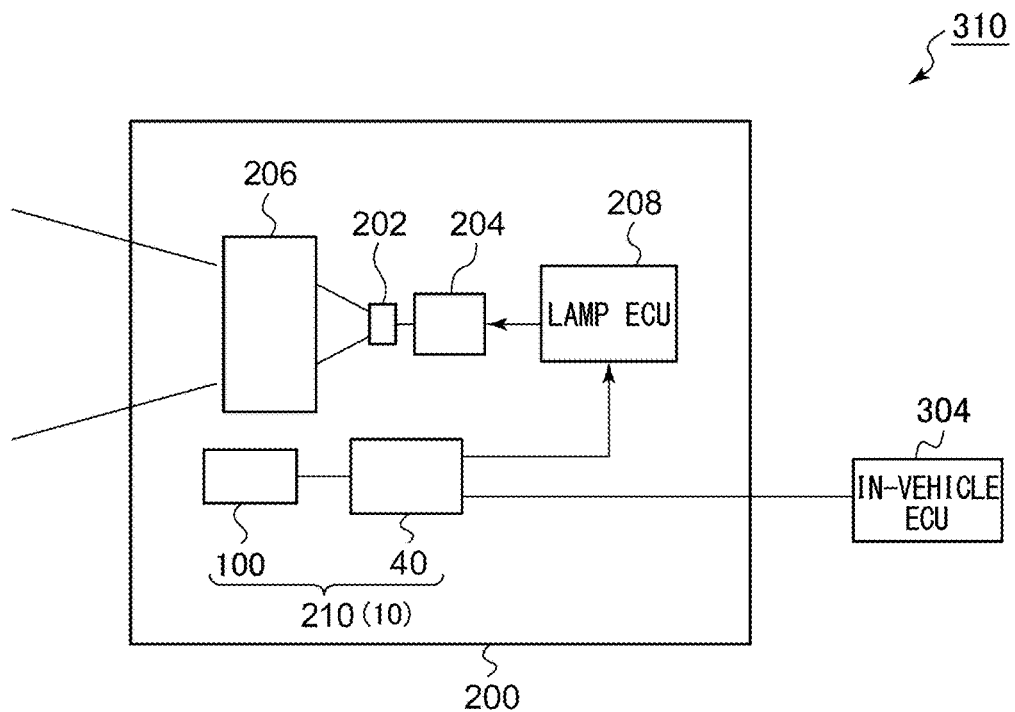
FIG. 18 is a diagram showing an automotive lamp provided with the object identification system.

FIG. 18 is a block diagram showing an automotive lamp 200 provided with an object detection system 210. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object detection system 210. The object detection system 210 corresponds to the object identification system 10 described above. The object detection system 210 includes the imaging apparatus 100 and the processing device 40.

Also, the information with respect to the object OBJ detected by the processing device 40 may be used to support the light distribution control operation of the automotive lamp 200. Specifically, a lamp ECU 208 generates a suitable light distribution pattern based on the information with respect to the kind of the object OBJ and the position thereof generated by the processing device 40. The lighting circuit 204 and the optical system 206 operate so as to provide the light distribution pattern generated by the lamp ECU 208.

Also, the information with respect to the object OBJ detected by the processing device 40 may be transmitted to the in-vehicle ECU 304. The in-vehicle ECU may support autonomous driving based on the information thus transmitted.

It should be noted that the usage of the imaging apparatus 100 is not restricted to such an in-vehicle imaging apparatus. Also, the imaging apparatus 100 is applicable to other usages.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

CLAUSES DESCRIBING FEATURES OF THE DISCLOSURE

Clause 12. An imaging apparatus comprising:
an illumination apparatus structured to be capable of irradiating infrared reference light having a controllable intensity distribution to an object;
a two-dimensional image sensor structured to be sensitive to an infrared range; and
a processing device structured to process an image captured by the two-dimensional image sensor,
wherein the imaging apparatus is structured such that (i) in a first mode, the two-dimensional image sensor captures a plurality of images while the illumination apparatus changes the intensity distribution of the reference light based on a sequence of a plurality of items of patterning data, and the processing device calculates a light detection intensity that corresponds to an integrated value of a plurality of pixels for each of the plurality of images, and performs calculation of a correlation between a plurality of light detection intensities that correspond to the plurality of images and the plurality of items of patterning data, so as to output a first output image, and (ii) in a second mode, the processing device outputs a second output image based on an image captured by the two-dimensional image sensor.

Clause 13 The imaging apparatus according to clause 12, wherein, in the second mode, the illumination apparatus irradiates the reference light having a uniform intensity distribution so as to operate the imaging apparatus as an active sensor.

Clause 14. The imaging apparatus according to clause 12, further comprising a judgment unit structured to judge whether a visibility level is good or poor,
wherein, when judgement has been made that the visibility is poor, the first mode is selected, and when the judgment has been made that the visibility is good, the second mode is selected.

Clause 15. The imaging apparatus according to clause 13, wherein, in a third mode, the imaging apparatus operates as a passive sensor,
and wherein, in the third mode, the illumination apparatus stops emitting light, and the processing device outputs a third output image based on an image captured by the two-dimensional image sensor.

Clause 16. The imaging apparatus according to clause 15, wherein the two-dimensional image sensor is sensitive to a visible light range in addition to the infrared range,
and wherein the third output image is a visible-light image.

Clause 17. The imaging apparatus according to clause 16, further comprising a judgment unit structured to judge whether visibility is good or poor and brightness of the surroundings,
wherein, (i) when judgement has been made that the visibility is poor, the first mode is selected, (ii) when the judgment has been made that the visibility is good and the surroundings are dark, the second mode is selected, and (iii) when the judgment has been made that the visibility is good and the surroundings are bright, the third mode is selected.

Clause 18. The imaging apparatus according to clause 15, wherein the third output image is an infrared image.

Clause 19. The imaging apparatus according to clause 12, wherein, in a hybrid mode, the illumination apparatus changes the intensity distribution of a first portion of the reference light, and generates a second portion of the reference light with a uniform intensity distribution,
wherein the processing device generates the first output image by calculating a correlation with respect to the irradiation region of the first portion of the reference light, and generates the second output image based on an image captured by the two-dimensional image sensor with respect to the irradiation region of the second portion of the reference light.

Clause 20. The imaging apparatus according to clause 12, wherein, in the second mode, the imaging apparatus operates as a passive sensor, and the illumination apparatus stops emitting light.

Clause 21. An automotive lamp comprising the imaging apparatus according to clause 12.

Clause 22 A vehicle comprising the imaging apparatus according to clause 12.

What is claimed is:

1. An imaging apparatus using correlation calculation, comprising:
    a light source structured to generate a light beam having a uniform intensity distribution;
    a patterning device structured to modulate the intensity distribution of the light beam according to two-gradation first image data;
    a photodetector structured to receive reflected light from an object;
    a controller structured to generate second image data, and structured to convert the second image data so as to generate the first image data; and
    a processing device structured to perform calculation of a correlation between a detection intensity based on an output of the photodetector and the m-gradation (m≥2) second image data, so as to reconstruct a reconstructed image of the object,
    wherein a number of pixels of the first image data is larger than a number of pixels of the second image data,
    wherein each pixel of the second image data is associated with a pixel group comprising a plurality of L pixels of the first image data,
    and wherein, in a case in which the second image data is configured as m-gradation data (m≥3), a normalized gradation value k of a given pixel of the second image data is set to one from among m values from 0, 1/(m-1), 2/(m-1), ..., (m-2)/(m-1), and 1, and with a number of pixels having a value of 1 included in the pixel group that corresponds to the given pixel as l, a relation l=L×k holds true.

2. The imaging apparatus according to claim 1, wherein the controller assigns values from among 1 and 0 to the pixel group according to a predetermined layout rule.

3. The imaging apparatus according to claim 2, wherein the layout rule is determined such that a value of 1 is preferentially assigned to pixels from the center of the pixel group.

4. The imaging apparatus according to claim 2, wherein the layout rule is determined such that a value of 1 is uniformly assigned to the pixel group.

5. The imaging apparatus according to claim 2, wherein the layout rule is determined such that the values of 1 and 0 are randomly assigned to the pixel group.

6. The imaging apparatus according to claim 1, wherein there is a size difference in pixels that form the second image data corresponding to a position thereof.

7. The imaging apparatus according to claim 1, wherein the patterning device is configured as a Digital Micromirror Device (DMD).

8. An automotive lamp comprising the imaging apparatus according to claim 1.

9. A vehicle comprising the imaging apparatus according to claim 1.

10. An illumination apparatus employed in an imaging apparatus using correlation calculation, the illumination apparatus comprising:
- a light source structured to generate a light beam having a uniform intensity distribution;
- a patterning device comprising an array of pixels having a first number of pixels, and structured to modulate the intensity distribution of the light beam according to two-gradation first image data comprising the first number of pixels; and
- a controller structured to generate m-gradation (m≥2) random second image data comprising a second number of pixels that is smaller than the first number of pixels so as to supply the second image data to correlation calculation, to convert the second image data into the first image data, and to supply the first image data to the patterning device wherein, in a case in which the second image data is configured as m-gradation data (m≥3), a normalized gradation value k of a given pixel of the second image data is set to one from among m values from 0, $1/(m-1)$, $2/(m-1)$, ..., $(m-2)/(m-1)$, and 1, and with a number of pixels having a value of 1 included in the pixel group that corresponds to the given pixel as l, a relation $l = L \times k$ holds true.

* * * * *